United States Patent [19]

Chiba

[11] Patent Number: 4,908,128
[45] Date of Patent: Mar. 13, 1990

[54] COMPOSITE BACTERIA SUPPORT MEDIUM

[75] Inventor: Akira Chiba, Frenchs Forest, Australia

[73] Assignee: Envirocycle Pty. Ltd., Forestville, Australia

[21] Appl. No.: 243,256

[22] Filed: Sep. 12, 1988

[30] Foreign Application Priority Data

Sep. 15, 1987 [AU] Australia ................. PI4422

[51] Int. Cl.$^4$ ............................................. B01D 33/34
[52] U.S. Cl. ................................. 210/150; 210/615; 428/198; 428/286
[58] Field of Search ............ 210/150, 151, 615; 428/286, 198, 296

[56] References Cited

U.S. PATENT DOCUMENTS

| | | | |
|---|---|---|---|
| 2,051,727 | 8/1936 | Levine et al. | 210/150 |
| 3,347,381 | 10/1967 | Minch et al. | 210/150 |
| 3,543,937 | 12/1970 | Choun | 210/150 |
| 3,589,518 | 6/1971 | Brebion et al. | 210/150 |
| 4,005,010 | 1/1977 | Lunt | 210/150 |
| 4,165,281 | 8/1979 | Kuriyama et al. | 210/150 |
| 4,200,532 | 4/1980 | Iwatani | 210/151 |
| 4,229,386 | 10/1980 | Lerner | 210/150 |
| 4,333,893 | 6/1982 | Clyde | 210/150 |
| 4,336,296 | 6/1982 | Fukuta et al. | 428/296 |
| 4,416,993 | 11/1983 | McKeown | 210/150 |
| 4,568,581 | 2/1986 | Peoples, Jr. | 428/296 |
| 4,588,630 | 5/1986 | Shimalla | 428/296 |
| 4,668,562 | 5/1987 | Street | 428/296 |
| 4,708,792 | 11/1987 | Takarabe et al. | 210/150 |
| 4,758,453 | 7/1988 | Challet et al. | 210/150 |
| 4,761,323 | 8/1988 | Muhlratzer et al. | 428/198 |

Primary Examiner—Richard V. Fisher
Assistant Examiner—Cynthia L. Nessler
Attorney, Agent, or Firm—Arnold, White & Durkee

[57] ABSTRACT

A composite support medium for bacteria in sewage treatment plants comprises two intimately associated quantities of media having disparate surface area to volume ratios; in particular a core body of tangled plastics wire-like filaments welded together and having an area to volume ratio of from 60 to 80 square meters per cubic meter partly wrapped in a mat of tangled plastics textile type filaments welded together having an area to volume ratio of from 350 to 450 square meters per cubic meter.

10 Claims, 1 Drawing Sheet

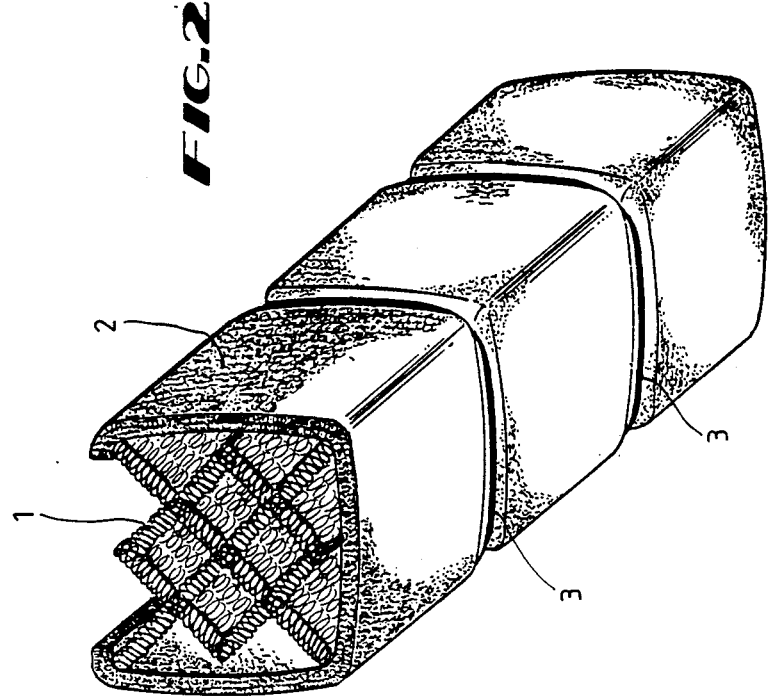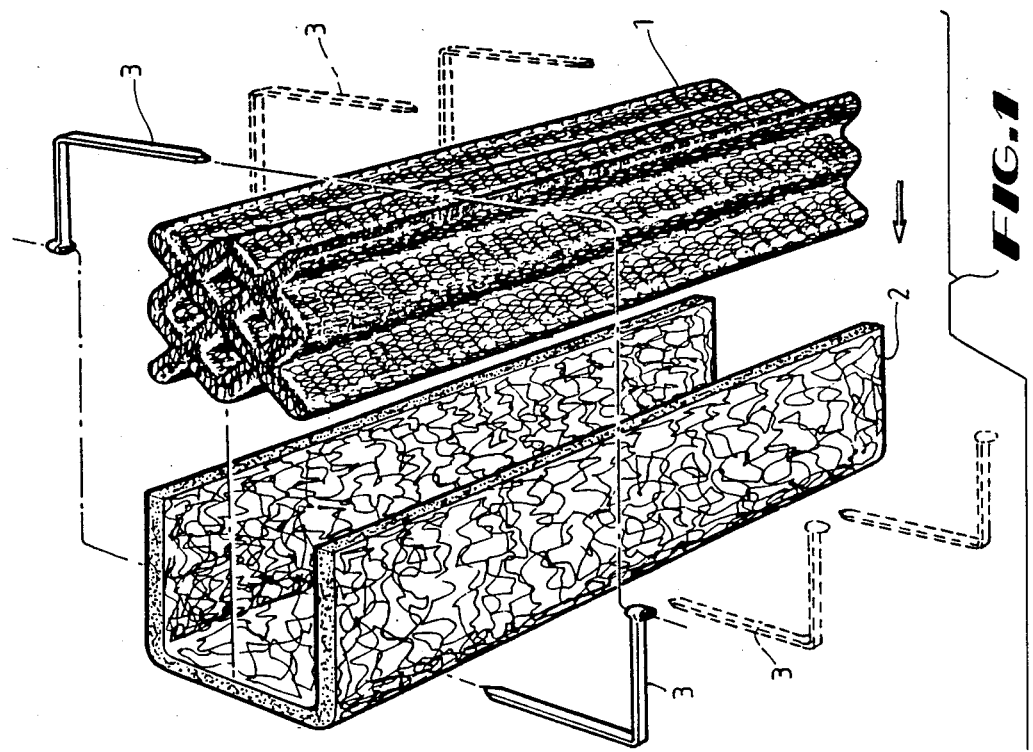

COMPOSITE BACTERIA SUPPORT MEDIUM

FIELD OF THE INVENTION

This invention relates to the treatment of sewage and other wastes by micro-biological degradation. More particularly it relates to the media used in treatment tanks for the support of bacterial populations for effecting such degradation.

DESCRIPTION OF THE PRIOR ART

It is well known in the treatment of sewage to treat liquid and suspended solids in a chamber by diffusing air into the chamber at or near the floor thereof to effect circulation and agitation of the liquid.

Not only do the rising air bubbles circulate the liquid but also they produce conditions suitable for the growth of aerobic bacteria which are efficient at degrading the influent material to be treated.

Sometimes treatment installations incorporate a plurality of such aerobic treatment chambers arranged in series, that is to say, the effluent from the first chamber is the influent for the next and so on to the last chamber of the series.

Frequently the first aerobic treatment chamber of the series is preceded by an anaerobic treatment chamber devoid of aeration and the last chamber of the series is followed by a sedimentation chamber and a disinfecting chamber wherein the final effluent liquid is treated with a disinfecting agent such as chlorine. Often sediment from the sedimentation chamber is recycled by being pumped to an upstream chamber of the series.

The need for maintenance operations in sewage treatment systems of the above described kind is usually determined by the build-up of sludge in the aerobic treatment chamber (or the first such chamber of the series if there be more than one), which eventually interferes with the flow of air and the circulation of liquid within the chamber, and thus with the growth and activity of the bacteria, so that eventually an unacceptably high level of undigested particulate matter appears in the chamber effluent. This requires an expensive maintenance operation involving opening the chamber, pumping out the accumulated sludge and disposing of it at a remote disposal site.

It is also well known that the efficiency of an aerobic treatment chamber may be increased and the rate of sludge build-up decreased by placing a quantity of bacteria support medium within the chamber. Typically such media comprise a plurality of discrete irregularly shaped bodies, similar bodies of regular shape but such that they cannot pack tightly together, stacks of perforated non-planar sheets (honeycomb structures), sheets of tangled, rigid plastics wire-like filaments or strips, frequently fused together at points of contact between individual wire-like filaments or strips, and other solid media through which liquid may readily flow and which provide a large surface area on which bacteria may grow.

The term "wire-like filaments" as used herein is intended to refer to filaments of a sufficiently large diameter to be rigid and self supporting in lengths of say 20 cm. as distinguished from pliable "textile type filaments" of much less diameter.

Such media have two effects; they promote the growth of large populations of micro-organisms, and they tend to trap suspended solids and so delay accumulation of sludge at the bottom of the chamber.

For the most part the sludge is composed of dead bacteria and as a general rule sludge derived from so-called "lower order" micro-organisms will itself be digested by "higher order" micro-organisms adapted to feed on the lower order organisms. The reverse is not the case.

Hitherto, the medium in aerobic treatment chambers has been homogeneous, that is to say it is usual for the designer to opt for a particular medium and use only that medium in the chamber concerned.

SUMMARY OF THE INVENTION

An object of the invention is to extend the time interval between such maintenance operations by reducing the rate of sludge build-up in the bottom of the aerobic treatment chamber of a sewage treatment installation.

The invention is based upon the discovery that the type of micro-organism that develops and grows in otherwise similar conditions is greatly dependent on the physical nature of the support medium. In particular, higher order organisms able to digest sludge of lower order organisms are favoured in their development by a very open medium, that is to say, one which presents little resistance to the throughflow of liquid, having a high surface area to volume ratio.

In investigating possible media of that kind a loosely packed mat of tangled small diameter "textile type filaments" was found to be effective; and according to a first aspect the invention consists in a bacteria support medium comprising such a mat.

One suitable mat, which is sold commercially as upholstering padding, utilises stiffly resilient filaments welded together at at least some of the junction points where one filament touches itself or another. Notwithstanding the relative stiffness of the filaments they are not "wire-like" and sheets of the padding are not self supporting.

In experiments leading to the invention sheets of mat according to the first aspect of the invention were sandwiched between sheets of similarly constructed but known medium utilising plastics "wire-like filaments" of about 3 mm. diameter.

The sheets of the known medium are less open than the mat of the invention and have a lesser surface area to volume ratio but, being self-supporting, were utilised initially to support the flexible mat sheets. It was found however that the composite medium performed in a superior way to a medium of either component alone. This was due to the enhanced variability of the microbial population which was found to contain substantial numbers of micro-organisms of both high and low orders. It is thought that the action of the higher order organisms reduces the formation of sludge and the lower order organisms are necessary as a food for the higher order organisms.

Thus, according to a second aspect of the invention, it consists in the use in a single treatment chamber of at least two support media of differing physical characteristics, for example their surface area to volume ratios, thereby to promote variability in the bacteria population of the chamber.

In a third aspect, the invention consists in a composite bacteria support medium comprising a first quantity of medium having a predetermined surface area to volume ratio and a second quantity of medium having a substantially different surface area to volume ratio in intimate association with the first quantity.

BRIEF DESCRIPTION OF THE DRAWINGS

FIG. 1 is a perspective exploded view of a composite medium according to the third aspect of the invention.

FIG. 2 is a more diagrammatic perspective representation of the assembled medium of FIG. 1.

DESCRIPTION OF THE PREFERRED EMBODIMENTS

In preferred embodiments of the invention according to its third aspect, the two quantities are in sheet form and may be interleaved or stacked alternately one upon the other. In other embodiments one quantity of the media may be wrapped upon or enshrouded by the other.

One such embodiment is diagrammatically illustrated by the accompanying drawings which show a columnar media unit comprising a core 1 fabricated from wire-like plastic filaments tangled and fused together, wrapped, or partly wrapped, in a coherent layer 2 of similar structure but made from much finer, more closely tangled textile type filaments, also of plastics material.

The layer 2 is supported by the core 1 and may be held in place by, for example, plastics tapes or cable ties 3.

Attention is directed to the cross-sectional shape of the core 1, namely a composite of a square and a cross. This defines a plurality of open passages extending from the bottom to the top of the composite medium unit. Those passages enhance the free flow of liquid streams and rising air bubbles in the chamber containing the medium and markedly increase the efficiency of operation. It will of course be appreciated that the precise cross-section is a matter of design choice, but it is desirable that passages of the kind discussed be present.

For preference, one quantity, for example the layer 2 of the illustrated media unit, is a mat according to the first aspect of the invention having a percentage of void space of from 90% to 93% or thereabout and a surface area to volume ratio of from 350 to 450, preferably about 400, square meters per cubic meter and the other quantity, for example the core 1 of the illustrated media unit, is of coarser material having about 80%, void space and an area/volume ratio of from 60 to 80, preferably about 70 square meters per cubic meter.

I claim:

1. A composite bacteria support medium comprising: two proximately arranged component bacteria support media of differing characteristics, a first bacteria support medium having a predetermined surface area to volume ratio and a second bacteria support medium having a substantially different surface area to volume ratio in intimate association with the first medium forming a means for encouraging the growth of substantial numbers of not only higher order but also lower order microorganisms within one said composite medium.

2. A composite bacteria support medium according to claim 1 wherein each said medium comprises a plurality of sheets and wherein the sheets of the first medium are interleaved with those of the second medium.

3. A composite bacteria support medium according to claim 1 wherein: said first medium is a self supporting core and said second medium is a sheet at least partly shrouding said core.

4. A composite bacteria support medium according to claim 1 wherein: said first medium has an area to volume ratio of from 60 to 80 square meters per cubic meter, and said second medium has an area to volume ratio of from 350 to 450 square meters per cubic meter.

5. A composite bacteria support medium according to claim 1 formed to provide a plurality of passages extending through the composite medium from bottom to top.

6. A composite bacteria support medium according to claim 1 wherein: sheets of first medium having an area to volume ratio of from 60–80 meters per cubic meter, containing a multiplicity of upright passages, are interleaved with sheets of second medium having an area to volume ratio of from 350 to 450 square meters per cubic meter.

7. A composite bacteria support medium according to claim 1 wherein sheets of first medium having an area to volume ratio of from 60–80 meters per cubic meter are interleaved and in contact with sheets of second medium having an area to volume ratio of from 350 to 450 square meters per cubic meter.

8. A composite bacteria support medium according to claim 1 wherein a self-supporting core of first medium having an area to volume ratio of from 60 to 80 square meters per cubic meter is partly enveloped by an intimately proximal outer wrap of second medium having an area to volume ratio of from 350 to 450 square meters per cubic meter.

9. A composite bacteria support medium according to claim 1 wherein an upright self-supporting core of first medium having an area to volume ratio of from 60 to 80 square meters per cubic meter is partly enveloped by an intimately proximal upright outer wrap of second medium having an area to volume ratio of from 350 to 450 square meters per cubic meter.

10. A composite bacteria support medium according to claim 1 wherein a self-supporting core of first medium having an area to volume ratio of from 60 to 80 square meters per cubic meter is partly enveloped and in contact with an outer wrap of second medium having an area to volume ratio of from 350 to 450 square meters per cubic meter.

* * * * *